US009086290B2

(12) United States Patent
Obara et al.

(10) Patent No.: US 9,086,290 B2
(45) Date of Patent: Jul. 21, 2015

(54) MAP DATA DISTRIBUTION SERVER, MAP DATA DISTRIBUTION SYSTEM, AND MAP DATA DISTRIBUTION METHOD

(75) Inventors: Kiyohiro Obara, Hachioji (JP); Yoshinori Musha, Matsudo (JP)

(73) Assignee: HITACHI, LTD., Tokyo (JP)

( * ) Notice: Subject to any disclaimer, the term of this patent is extended or adjusted under 35 U.S.C. 154(b) by 258 days.

(21) Appl. No.: 13/550,728

(22) Filed: Jul. 17, 2012

(65) Prior Publication Data

US 2013/0024548 A1    Jan. 24, 2013

(30) Foreign Application Priority Data

Jul. 21, 2011   (JP) ................................. 2011-160047

(51) Int. Cl.
    *G01C 21/32*   (2006.01)
    *G08G 1/0968*  (2006.01)

(52) U.S. Cl.
    CPC .............. *G01C 21/32* (2013.01); *G08G 1/0968* (2013.01)

(58) Field of Classification Search
    CPC ... G08G 1/0968–1/09685; G01C 21/26–21/34
    USPC .................. 709/203, 217–219; 701/450–453
    See application file for complete search history.

(56) References Cited

U.S. PATENT DOCUMENTS

| 6,453,233 | B1 * | 9/2002 | Kato ............................. 701/451 |
| 6,546,334 | B1 * | 4/2003 | Fukuchi et al. ............... 701/532 |
| 6,643,584 | B1 * | 11/2003 | Ikeuchi et al. ................ 701/410 |
| 7,739,037 | B2 * | 6/2010 | Sumizawa et al. ............ 701/453 |
| 2005/0159885 | A1 * | 7/2005 | Nomura ........................ 701/208 |
| 2006/0173613 | A1 * | 8/2006 | Iwahori ........................ 701/208 |
| 2007/0093960 | A1 * | 4/2007 | Atarashi ....................... 701/211 |
| 2007/0208505 | A1 * | 9/2007 | Fujimoto ...................... 701/208 |
| 2008/0086262 | A1 * | 4/2008 | Asahara et al. ............... 701/208 |
| 2011/0251790 | A1 * | 10/2011 | Liotopoulos et al. ......... 701/209 |

FOREIGN PATENT DOCUMENTS

JP        2003-65770        3/2003

* cited by examiner

*Primary Examiner* — Brendan Higa
(74) *Attorney, Agent, or Firm* — Baker Botts L.L.P.

(57) ABSTRACT

A map data distribution server that is connected to a network and distributes map data via the network is provided. The map data distribution server holds first map data and second map data that is of a newer version than the first map data and holds a plurality of update data including an instruction to update the first map data for each of partitions of a given size on a map. The map data distribution server decides whether a predetermined condition is fulfilled upon receiving an update request to update the first map data in a first partition out of the partitions to the second map data from a terminal communicating with the map data distribution server via the network, selects one of the plurality of update data relevant to the first partition, based on the result of the decision, and transmits the selected update data to the terminal.

11 Claims, 6 Drawing Sheets

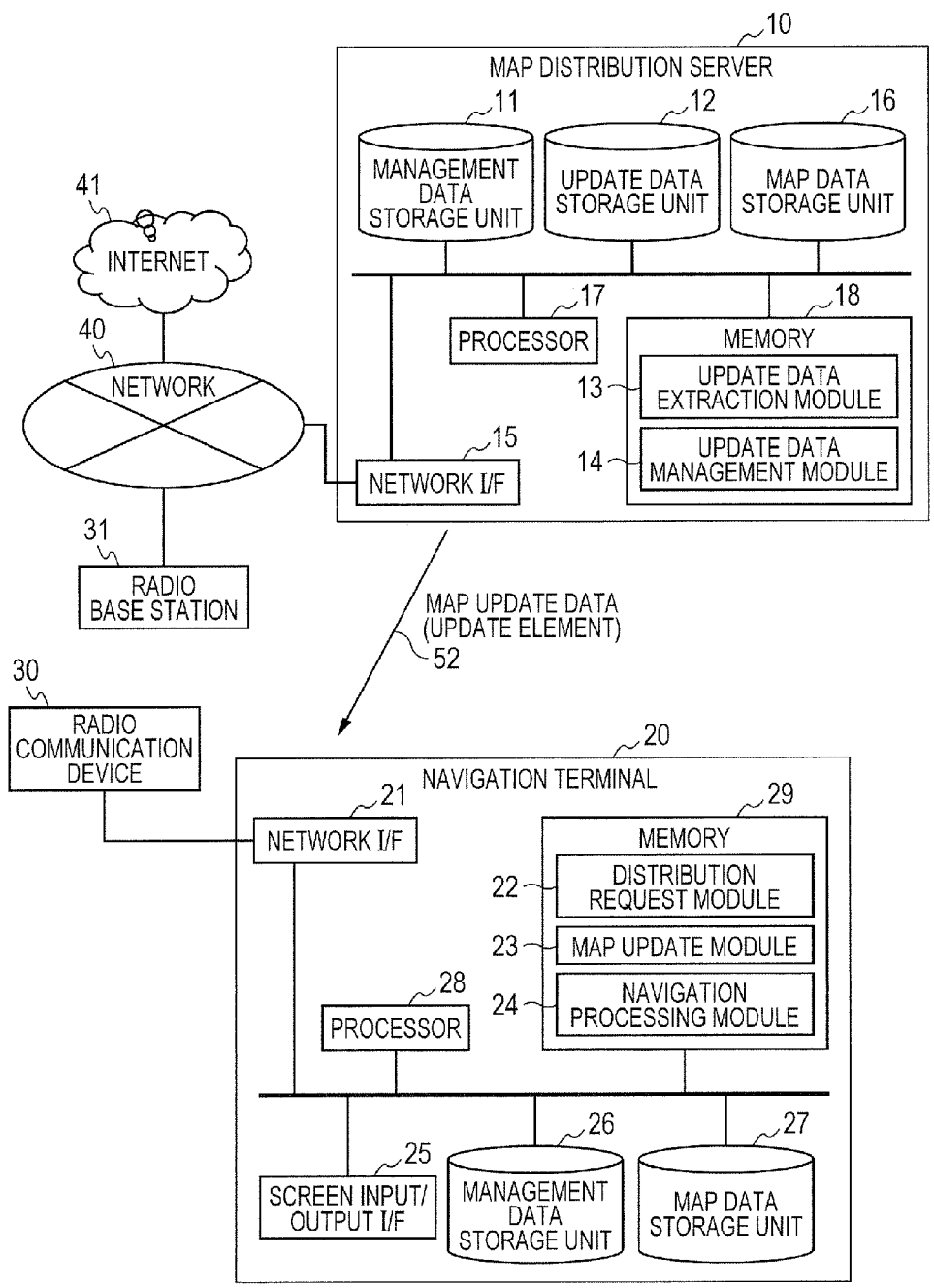

FIG. 2A

TABLE MAPPING BETWEEN PARCEL ID
AND PREFECTURE CODE
200

| PARCEL ID 201 | PREFECTURE CODE 202 |
|---|---|
| 0001 | 10 |
| 0001 | 11 |
| 0001 | 12 |
| 0002 | 13 |
| 0002 | 14 |
| ... | ... |

FIG. 2B

TABLE MAPPING BETWEEN TERMINAL ID AND PREFECTURE CODE
FOR WHICH TERMINAL HAS UPDATE RIGHT
220

| TERMINAL ID 221 | LIST OF PREFECTURES FOR WHICH TERMINAL HAS UPDATE RIGHT 222 |
|---|---|
| NAVI-1000 | 12 |
| NAVI-1001 | 13 |
| NAVI-2000 | 1 |
| NAVI-2010 | 47 |
| ... | ... |

FIG. 2C

TABLE MAPPING BETWEEN PARCEL ID
AND UPDATE ELEMENT
240

| PARCEL ID 241 | UPDATE ELEMENT ID 242 |
|---|---|
| 0001 | 10 |
| 0002 | 11 |
| 0003 | 12 |
| 0004 | 13 |
| 0005 | 14 |
| ... | ... |

FIG. 3A

TABLE MAPPING BETWEEN TERMINAL ID AND PREFECTURE CODE
FOR WHICH TERMINAL HAS UPDATE RIGHT

| TERMINAL ID | LIST OF PREFECTURES FOR WHICH TERMINAL HAS UPDATE RIGHT | LIST OF PREFECTURES FOR WHICH TERMINAL DOES NOT HAS UPDATE RIGHT |
|---|---|---|
| NAVI-1000 | 12 | 1, 2, 3, 4, ..., 46, 47 |
| NAVI-1001 | 13 | 1, 2, 3, 4, ..., 46, 47 |
| NAVI-2000 | 1 | 2, 3, 4, ..., 46, 47 |
| NAVI-2010 | 47 | 1, 2, 3, 4, ..., 46 |
| ... | ... | ... |

FIG. 3B

TABLE MAPPING BETWEEN PREFECTURE CODE
AND UPDATE ELEMENT FOR HATCHING

| PREFECTURE CODE | UPDATE ELEMENT ID LIST |
|---|---|
| 1 | 100, 101, 102, ... |
| 2 | 110, 111, 112, ... |
| 12 | 120, 121, 122, ... |
| 13 | 130, 131, 132, ... |
| 14 | 140, 141, 142, ... |
| ... | ... |

FIG. 4

UPDATE ELEMENT MANAGEMENT TABLE

| UPDATE ELEMENT ID | UPDATE DATA |
|---|---|
| 10 | insert ...., delete ...., update .... |
| 11 | insert ...., delete ...., update .... |
| 12 | insert ...., delete ...., update .... |
| 13 | insert ...., delete ...., update .... |
| 14 | insert ...., delete ...., update .... |
| ... | ... |
| 100 | insert ...., delete ...., update .... |
| 101 | insert ...., delete ...., update .... |
| 102 | insert ...., delete ...., update .... |
| 140 | insert ...., delete ...., update .... |
| ... | ... |

FLOWCHART OF AN OVERALL UPDATE PROCESS
WHEN THE TERMINAL DOES NOT HAVE AN UPDATE RIGHT

MAP DATA DISTRIBUTION SERVER, MAP DATA DISTRIBUTION SYSTEM, AND MAP DATA DISTRIBUTION METHOD

CLAIM OF PRIORITY

The present application claims priority from Japanese patent application JP 2011-160047 filed on Jul. 21, 2011, the content of which is hereby incorporated by reference into this application.

BACKGROUND

The present invention relates to a technique for providing a service using map data to a user and, in particular, to a technique for distributing data to update map data stored on a terminal device.

Services using map data such as a navigation service for motor vehicles or pedestrians are widely provided. Map data is normally displayed on the screen of a terminal possessed by a user who receives such a service. Besides, by displaying various kinds of additional information overlaying the map, convenience of users can be improved. A typical example of additional information is so-called VICS (Vehicle Information and Communication System, a registered trademark) information, that is, information on traffic congestion and restriction among others. Other examples of additional information that is beneficial for users are information on facilities recommended to users, weather information (for example, information on a road that may be flooded due to a so-called guerilla-like torrential rain or the like), etc.

On the other hand, map information stored on a terminal is updated to reflect a change due to new construction, abolition, or the like of a real road, facility, or the like. In this regard, although map data over a widespread area (e.g., all over Japan) may be updated in a lump, such update takes considerable time because of a large amount of data to be updated. Thus, in late years, inter alfa, a method in which update is confined to a partition for which update is required and update is performed on a per-partition basis (see, e.g., Japanese Unexamined Patent Application Publication No. 2003-65770) and a method of updating only data for differences (differences between old version map data and new version map data) for each partition are known.

SUMMARY

When map information is updated on a per-partition basis as described above, in one page of a map displayed on a terminal, latest map information may be displayed in some regions, while old map information may be displayed in other regions. In such a case, as the above-mentioned additional information, by displaying an overlay of information indicating a region where an old version of map is displayed and information showing a difference between new and old versions of map information (for example, information showing the position and shape or the like of a road that has newly been opened to traffic) in a region where an old version of map is displayed, among others, it is possible to induce the user to update the map.

In order to provide such additional information so that various kinds of terminals existing in the market can display that information in an overlay manner, it is necessary to adopt a common reference method in which such information can be handled by any of these terminals. For example, it is easily implemented to display an overlay of additional information based on coordinates (e.g., latitudes and longitudes) (for example, additional information is associated with coordinate values indicating a position where it should be displayed on the map and the terminal displays the additional information in the position indicated by the coordinate values). This is because the latitudes and longitudes and the like can be used in common by terminals such as general navigation devices. Thus, as for information that is displayed based on coordinates, such as information on facilities recommended to users, a terminal's function that displays information downloaded from a map sensor or Web site is implemented.

However, if the method of displaying additional information based on coordinates is adopted, additional information having a shape or an area, such as a road or a specific region, cannot be correctly overlaid on the map in some cases. For example, the shape of a road that is defined by a map stored on a terminal may differ depending on the map version. Hence, for example, in a case where traffic congestion information that is displayed so as to overlay a road is associated with coordinate values indicating the shape of the road on which it should be displayed, the traffic congestion information will be displayed in a position out of the road, unless the shape defined by the coordinate values matches the shape of the road defined by the map data stored on the terminal. The same may occur with the shape or the like of a specific region. In order to prevent this, it is desirable that additional information is associated with information identifying a road link or a region (e.g., a prefecture or the like) on the map (for example, typically, a road link ID) stored on the terminal.

However, it is difficult in practice to display additional information based on such association. This is because, for example, a road link ID corresponding to a section of the same road differs for each type of map stored on each terminal and information on the position and shape of a region such as a prefecture is not assigned even information identifying them.

Such a technique has already been developed that, for example, an information center provides traffic congestion information associated with a road link ID and a terminal displays an overlay of the traffic congestion information on the map. This is implemented by providing an individual terminal with a conversion table that maps between road ink IDs which are transmitted from the information center and road link IDs in the map data stored on the terminal. Furthermore, even after a road link is added or deleted in a new version of map data to reflect a change of a real road, the information center continues to provide traffic congestion information associated with a road link ID in an old version in order to allow the traffic congestion information to be displayed on an old version of map for a certain period even after the version is replaced by a new one. Consequently, the cost for implementing such a method increases.

On the other hand, shape information on a prefecture or the like can also be updated on a per-parcel basis. Here, the parcel is a manageable unit of map data, which corresponds to a partition of a given size. However, in this case, because it is necessary to update all background information such as building shapes, green spaces, and rivers, for each of a large number of parcels, the amount of update data increases to a great extent.

Alternatively, a method is also conceivable in which overlay information of a distinct scheme, not based on map data on the terminal, is transmitted from the map center or the like to the terminal. However, in this case, the terminal needs to have a plurality of display systems that completely differ from each other as applications and, thus, the cost of this method also increases.

The present invention has been contrived in view of the problems discussed above and is intended to provide additional information at low cost and in an easy-to-use form.

A typical aspect of the present invention is outlined as follows. A map data distribution server that is connected to a network and distributes map data via the network is provided. The map data distribution server includes an interface connected to the network, a processor connected to the interface, and a storage device connected to the processor. The map data distribution server holds first map data and second map data that is of a newer version than the first map data and holds a plurality of update data including an instruction to update the first map data for each of partitions of a given size on a map. The map data distribution server decides whether a predetermined condition is fulfilled upon receiving an update request to update the first map data in a first partition out of the partitions to the second map data from a terminal communicating with the map data distribution server via the network, selects one of the plurality of update data relevant to the first partition, based on the result of the decision, and transmits the selected update data to the terminal.

According to an aspect of the present invention, it is possible to provide additional information that is displayed on a map in an overlay manner at low cost and in an easy-to-use form.

BRIEF DESCRIPTION OF THE DRAWINGS

FIG. 1 is a block diagram representing an architecture of a map data distribution system according to an embodiment of the present invention;

FIG. 2A is a diagram illustrating a table mapping between parcel ID and prefecture code, held by a map distribution server in the embodiment of the present invention;

FIG. 2B is a diagram illustrating a table mapping between terminal ID and prefecture code for which terminal has update right, held by the map distribution server in the embodiment of the present invention;

FIG. 2C is a diagram illustrating a table mapping between parcel ID and update element, held by the map distribution server in the embodiment of the present invention;

FIG. 3A is a diagram illustrating a table mapping between terminal ID and prefecture code for which terminal has update right, held by the map distribution server in the embodiment of the present invention;

FIG. 3B is a diagram illustrating a table mapping between prefecture code and update element for hatching, held by the map distribution server in the embodiment of the present invention;

FIG. 4 is a diagram illustrating an update element management table held by the map distribution server in the embodiment of the present invention;

DETAILED DESCRIPTION

Figure 5:
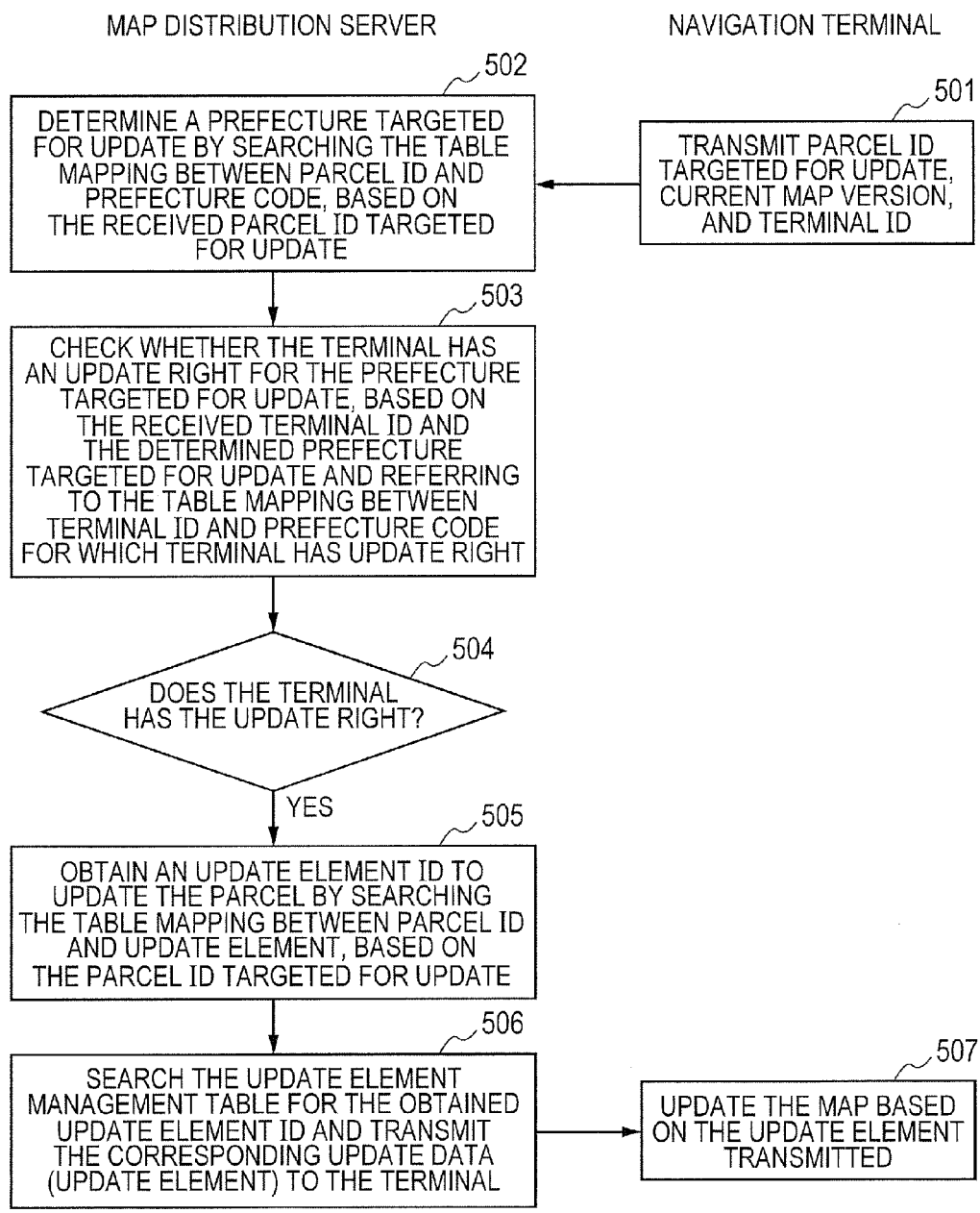
FIG. 5 is a first flowchart of a map data update process that is performed in the map data distribution system of the embodiment of the present invention.

In the following, an embodiment of the present invention will be described in conjunction with the drawings.

FIG. 1 is a block diagram representing an architecture of a map data distribution system according to an embodiment of the present invention.

The map data distribution system of the present embodiment includes a map distribution server 10 connected to a network 40 and a navigation terminal 20 that communicates with the map distribution server 10 via the network 40.

The map distribution server 10 is a computer including a processor 17, a memory 18, a network interface (I/F) 15, a management data storage unit 11, an update data storage unit 12, and a map data storage unit 16 interconnected with each other.

The processor 17 executes programs stored in the memory 18.

The memory 18 is, for example, a semiconductor memory and stores, inter alfa, programs that are executed by the processor 17, data that is referenced by the processor 17, and data that has been output from the processor 17. At least, an update data extraction module 13 and an update data management module 14 which are programs to be executed by the processor 17 are stored in the memory 18 in the present embodiment. Processes that are implemented by executing the programs by the processor 17 will be discussed later. In the following description, as for wording that, for example, the update data extraction module 13 executes a process; actually, the processor 17 executes the process according to a program such as the update data extraction module 13.

The network I/F 15 is connected to the network 40 for communication with the navigation terminal 20 among others.

The management data storage unit 11, update data storage unit 12, and map data storage unit 16 each may be independent storage devices like hard disk drives (HDD) or flash memories or may be allocated storage areas within a single storage device.

Map data is stored in the map data storage unit 16. The map data includes coordinate values and the like that represent the positions and shapes of components (planimetric features) of a map. Real planimetric features are updated occasionally. One example hereof is updating a road network such as new construction, abolition, or replacement of a road. The map data may include information on planimetric features at a point of time in the past and information on planimetric features at a later point of time (in other words, old version map data and new version map data).

Generally, map data is managed in units of rectangular partitions of a given size. These rectangular partitions are called parcels or meshes. Each parcel is assigned a unique identifier (parcel ID).

Map update data in units of planimetric features (including map information and road network information) is stored in the update data storage unit 12. For example, if a navigation terminal 20 has a certain version of map data, the map update data is data that is created and transmitted to update this map data to a new version of map data and, in particular, includes at least data for differences between these versions. Specifically, an update element including at least information instructing to update map data is stored in the update data storage unit 12.

Map data and update elements will now be explained.

Map data is used for a navigation terminal 20 to search for a route, display a map and a searched route, and guide the user (driver) along the searched route. Principal data included in map data is road data, background data, and guidance data. The road data describes a road network by connections between nodes which correspond to intersections and links which correspond to road sections connecting the intersections. This data is used for a route search and displaying roads on screen by the navigation terminal 20. The background data mainly represents the positions and shapes or the like of planimetric features other than roads (e.g., green spaces, ponds, rivers, railway tracks, buildings, etc.). This data is used for displaying a map on screen by the navigation terminal 20. Specifically, the background data includes data such as points, lines, or polygons that represent individual planimetric features and may further include text that describes the name of a place, building, or the like. The guidance data includes information that is displayed on the screen of the navigation terminal 20, as required to guide the user of the navigation terminal 20; for example, information representing a detailed shape of an intersection.

All of the road data, background data, and guidance data in the present embodiment may be basically the same as used in existing navigation systems and, therefore, detailed description thereof is dispensed with. However, in some cases, the background data in the present embodiment may include additional information which will be described later.

An update element includes differences between old version map data and new version map data and, more specifically, information instructing to update the map data from an old version to a new version. For example, as information instructing to update road data, an update element may include information that instructs to add nodes and links corresponding to a newly constructed road, delete links and nodes corresponding to an abolished road, and change the positions and shapes or the like of links and nodes corresponding to a replaced road. Further, as information instructing to update background data, an update element may include information that instructs to add an object (e.g., a graphic symbol such as a point, line, or polygon) showing a newly constructed planimetric feature (e.g., a building or the like) on the map, delete an object showing a removed planimetric feature, and alter an object showing a planimetric feature whose shape or the like was altered. Description on an update element to update guidance data is dispensed with.

Update elements are normally managed parcel by parcel. For example, when the navigation terminal 20 transmits a map distribution request for a parcel to the map distribution server 10, the map distribution server 10 transmits an update element relevant to the parcel back to the navigation terminal 20 (52). The navigation terminal 20 updates the map data for the parcel according to the received update element.

However, as for road data, in some cases, parcel by parcel update may result in a break or the like of a road at the boundary of a parcel. Updating only a portion of the nodes and links corresponding to a continuous road may result in a situation that normal data reference cannot be made because of inconsistency between updated data and data not updated. Hence, as for road data, update may be performed for each road that is continuous, instead of parcel by parcel update. In each case, information instructing to update background data is managed parcel by parcel. Accordingly, the present embodiment is applicable in each case.

Information for management of map update data is stored in the management data storage unit 11. For example, inter alia, information indicating a version of map update data (that is, a generation of difference) and a parcel ID indicating a position where the map update data should be applied are stored in the management data storage unit 11. Besides, in the management data storage unit 11 in the present embodiment, at least, a table mapping between parcel ID and prefecture code 200, a table mapping between terminal ID and prefecture code for which terminal has update right 220, a table mapping between parcel ID and update element 240, a table mapping between terminal ID and prefecture code for which terminal has update right 300, and a table mapping between prefecture code and update element for hatching 320 are stored. Details on these tables will be described later (see FIGS. 2A-2C and FIGS. 3A and 3B).

The navigation terminal 20 is a mobile terminal that performs, inter alia, a route search and showing the search result to guide the user to a destination. For example, it is an in-vehicle navigation terminal mounted in a motor vehicle or a pedestrian navigation terminal carried by a pedestrian. In the latter case, the navigation terminal 20 may be a mobile phone or the like with application software for navigation embedded in it.

In general, a map data distribution system includes a plurality of navigation terminals 20 which are, however, not shown in FIG. 1. Although, in the present embodiment, the navigation terminal 20 is shown as a typical example of a terminal device, the present invention can also be applied to any type of terminal device that stores and uses map information.

The navigation terminal 20 in the present embodiment includes a processor 28, a memory 29, a network I/F 21, a screen input/output I/F 25, a management data storage unit 26, and a map data storage unit 27.

The processor 28 executes programs stored in the memory 29.

The memory 29 is, for example, a semiconductor memory and stores, inter alia, programs that are executed by the processor 28 and data that is referenced by the processor 28. In the memory 29 in the present embodiment, a distribution request module 22, a map update module 23, and a navigation processing module 24 which are programs to be executed by the processor 28 are stored.

The distribution request module 22 transmits a map update data distribution request to the map distribution server 10. The map update module 23 updates map data stored in the map data storage unit 27, using map update data distributed. These processes will be described later (see FIG. 5 and FIG. 6). In the following description, as for wording that processes are executed by the distribution request module 22, map update module 23, and navigation processing module 24; actually, the processor 28 executes the processes according to the respective programs.

The navigation processing module 24 searches for a route to a destination and guides the user along the route, based on map data stored in the map data storage unit 27. Such route search and guidance can be performed by a publicly known method as in an existing in-vehicle navigation terminal and, therefore, detailed description thereof is dispensed with.

The screen input/output I/F 25 includes a screen on which map information or the like is displayed to the user and an input device that accepts input from the user. The screen input/output I/F 25 may be comprised of, for example, a liquid crystal display device and a keyboard or the like or may be a liquid crystal display device with a touch pad.

The network I/F 21 is connected to a radio communication device 30. The radio communication device 30 performs radio communication with a radio base station 31 connected to the network 40. The network I/F 21 performs communication with the map distribution server 10 via the radio communication device 30, radio base station 31, and network 40. Transmitting a map data distribution request and receiving map update data, which will be described later, are implemented by this communication.

The radio communication device 30 may be built in the navigation terminal 20.

The management data storage unit 26 and the map data storage unit 27 each may be independent storage devices like hard disk drives (HDD) or flash memories or may be allocated storage areas within a single storage device.

Map data that is referenced by the navigation processing module 24 is stored in the map data storage unit 27. This map data is updated according to map update data transmitted from the map distribution server 10.

Information for management of map data is stored in the management data storage unit 26. In the management data storage unit 26, for example, inter alia, information mapping between latitude/longitude and parcel ID, which indicates a parcel to which the position of the navigation terminal 20 itself belongs, and information identifying map update data applied to the map are stored.

The network 40 is connected to the Internet 41. The map distribution server 10 may acquire a new version of map data via the Internet.

FIG. 2A is a diagram illustrating a table mapping between parcel ID and prefecture code 200, held by the map distribution server 10 in the embodiment of the present invention.

The table mapping between parcel ID and prefecture code 200 contains entries of parcel ID 201 and prefecture code 202.

The parcel ID 201 is information identifying each parcel.

The prefecture code 202 is a code identifying a prefecture that falls within each parcel. As the prefecture code 202, for example, prefecture codes defined by Japanese Industrial Standards X0401 may be used or other identifiers may be used.

In the example of FIG. 2A, entries "10", "11", and "12" for the prefecture code 202 corresponding to a value "0001" of the parcel ID 201 are registered. This means that at least a part of a prefecture identified by the prefecture code "10", at least a part of a prefecture identified by the prefecture code "11", and at least a part of a prefecture identified by the prefecture code "12" fall within a parcel identified by the parcel ID "0001".

FIG. 2B is a diagram illustrating a table mapping between terminal ID and prefecture code for which terminal has update right 220, held by the map distribution server 10 in the embodiment of the present invention.

The table mapping between terminal ID and prefecture code for which terminal has update right 220 contains entries of terminal ID 221 and a list of prefectures for which the terminal has an update right 222.

The terminal ID 221 is information identifying each navigation terminal 20.

The list of prefectures for which the terminal has an update right 222 is a list of codes identifying prefectures for which each navigation terminal 20 has an update right of map data. For example, if the user of a navigation terminal 20 purchases an update right of map data for a prefecture, a code identifying the prefecture for which the user purchased the update right is added to the list of prefectures for which the terminal has an update right 222 corresponding to the terminal ID 221 of the navigation terminal 20. In the example of FIG. 2B, a code identifying one prefecture is registered in the list of prefectures for which the terminal has an update right 222 corresponding to each terminal ID 221; however, actually, list consisting of codes identifying a plurality of prefectures may be registered for each terminal.

In the present embodiment, an update right of map data is managed on a per-prefecture basis (that is, the user can purchase an update right of map data for each prefecture). The table mapping between parcel ID and prefecture code 200 (FIG. 2A) and the table mapping between terminal ID and prefecture code for which terminal has update right 220 (FIG. 2B) are referenced in order to decide whether the update requesting terminal has an update right for a prefecture falling within a parcel for which an update was requested. However, an update right of map data may be managed for each region (e.g., country) other than prefecture. In that case, instead of a prefecture identifying code, a code identifying a particular region is stored in the table mapping between parcel ID and prefecture code 200 and the table mapping between terminal ID and prefecture code for which terminal has update right 220.

FIG. 2C is a diagram illustrating a table mapping between parcel ID and update element 240, held by the map distribution server 10 in the embodiment of the present invention.

The table mapping between parcel ID and update element 240 contains entries of parcel ID 241 and update element ID 242.

The parcel ID 24 is information identifying each parcel and corresponds to the parcel ID 201 in the table mapping between parcel ID and prefecture code 200 (FIG. 2A).

The update element ID 242 is information identifying an update element that is applied to update the map data of each parcel from an old version to a new version. An update element corresponding to each update element ID will be described later with reference to FIG. 4.

In the table mapping between parcel ID and update element 240, only such an update element is registered that is transmitted to a navigation terminal 20 having an update right of map data. An update element that is transmitted to a navigation terminal 20 not having an update right of map data is registered in a table mapping between prefecture code and update element for hatching 320 which will be described later.

FIG. 3A is a diagram illustrating a table mapping between terminal ID and prefecture code for which terminal has update right 300, held by the map distribution server 10 in the embodiment of the present invention.

The table mapping between terminal ID and prefecture code which terminal has update right 300 contains entries of terminal ID 301, a list of prefectures for which the terminal has an update right 302, and a list of prefectures for which the terminal does not have an update right 303.

The terminal ID 301 and the list of prefectures for which the terminal has an update right 302, respectively, correspond to the terminal ID 221 and the list of prefectures for which the terminal has an update right 222 in the table mapping between terminal ID and prefecture code for which terminal has update right 220 (FIG. 2B).

The list of prefectures for which the terminal does not have an update right 303 is a list of codes identifying prefectures for which each navigation terminal 20 does not have an update right of map data. Specifically, codes identifying prefectures not registered in the list of prefectures for which each navigation terminal 20 has an update right 302 are registered in the list of prefectures for which the terminal does not have an update right 303.

The table mapping between terminal ID and prefecture code for which terminal has update right 300 is created based on the table mapping between terminal ID and prefecture code for which terminal has update right 220. Thus, the map distribution server 10 does not need to hold both the table mapping between terminal ID and prefecture code for which terminal has update right 220 and the table mapping between terminal ID and prefecture code for which terminal has update right 300 at the same time. Eventually, it is sufficient for the map distribution server 10 to hold only the table mapping between terminal ID and prefecture code for which terminal has update right 300. Alternatively, the map distribution server 10 may hold the table mapping between terminal ID and prefecture code for which terminal has update right 220 instead of the table mapping between terminal ID and prefecture code for which terminal has update right 300 and, as necessary, may create a list that corresponds to the list of prefectures for which the terminal has an update right 302 based on the list of prefectures for which the terminal has an update right 222.

FIG. 3B is a diagram illustrating a table mapping between prefecture code and update element for hatching 320, held by the map distribution server 10 in the embodiment of the present invention.

The table mapping between prefecture code and update element for hatching 320 contains entries of prefecture code 321 and an update element ID list 322.

The prefecture code 321 is a prefecture identifying code and corresponds to, for example, one of the prefecture identifying codes registered in the list of prefectures for which the terminal does not have an update right 303.

The update element ID list 322 is a list of the identifiers of update elements for hatching (that is, each of such update elements is used to update map data in a parcel that falls within a prefecture for which the navigation terminal 20 does not have an update right of map data). Details on the update elements for hatching will be described later (see FIG. 4).

Although the table shown in FIG. 3B only maps between prefecture codes and update elements for hatching, information that associates each update element for hatching with a parcel for which the update element is applied (that is, a parcel whose map data is updated according to the update element) may further be preserved in this table.

FIG. 4 is an update element management table 400, held by the map distribution server 10 in the embodiment of the present invention.

Upon acquiring a new version of map data, the map distribution server 10 creates an update element for updating old version map data to the new version map data. The created update element is registered in the update element management table 400 and stored in the update data storage unit 12.

The update element management table 400 contains entries of update element ID 401 and update data 402.

The update element ID 401 uniquely identifies each update element.

The update data 402 is update data contained in each update element. This update data specifically includes information instructing to add, delete, or alter an object in each parcel. A format of such update data may be the same as applied in existing navigation systems and, therefore, detailed description thereof is dispensed with.

Update elements that are registered in the update element management table 400 are not only update elements that are used when a navigation terminal 20 has an update right (that is, those corresponding to the entries of the update element ID 242), but also update rights that are used when a navigation terminal 20 does not have an update right (that is, those listed in the update element ID list 322).

For example, an update element ID "11" is registered in the table mapping between parcel ID and update element 240. Thus, the update element identified by the update element ID "11" is transmitted to a navigation terminal 20 that has the relevant update right and used. On the other hand, an update element ID "140" is registered in the table mapping between prefecture code and update element for hatching 320. Thus, the update element identified by the update element ID "140" is transmitted to a navigation terminal 20 that does not have the relevant update right and used. According to the present embodiment, for each parcel, at least two update elements, that is, an update element to be transmitted to a navigation terminal 20 that has the relevant update right and an update element to be transmitted to a navigation terminal 20 that does not have the relevant update right (that is, an update element for hatching) are prepared and either is selected and transmitted according to condition (see FIG. 5 and FIG. 6).

An update element to be transmitted to a navigation terminal 20 that has the relevant update right (that is, an update right registered in the table mapping between parcel ID and update element 240) includes information instructing to update road data, information instructing to update background data, and information instructing to update guidance data in order to update the map data from an old version to a new version, as described previously.

On the other hand, an update element for hatching, in principle, does not include information for updating the map data from an old version to a new version, because it is to be transmitted to a navigation terminal 20 that does not have an update right. That is, an update element for hatching, in principle, does not include information instructing to update road data and information instructing to update guidance data. However, as for information instructing to update background data, an update element for hatching, in principle, does not include information representing differences between old and new map data (that is, information instructing to add, delete, or alter an object corresponding to a planimetric feature), but includes an instruction to add a display showing that an update right is not granted as additional information.

For example, an update element for hatching includes, inter alia, an instruction to add a graphic object showing a prefecture for which the update right is not granted. The graphic object showing a prefecture for which the update right is not granted is the one displayed to show a prefecture whose map data cannot be updated because the navigation terminal 20 that requested an update does not have its update right; for example, it is hatching displayed overlaying a region of the prefecture. Hatching may be of any kind such as, e.g., a particular color, tone, or pattern, which is displayed over the region of the prefecture. While hatching may be displayed so as to be superposed over a map that has already been displayed, it is desirable that it is displayed as an overlay of a translucent color or the like so that the map being displayed before hatched is visible. Such hatching is displayed for the purpose of inducing the user of the navigation terminal 20 to purchase the relevant update right. Accordingly, an update element for hatching may further include, inter alia, text informing the user that the update right is not granted and text advising the user to purchase the update right.

In a case where a newly added road exists in a prefecture for which the update right is not granted, an update element for hatching may further include an instruction to add a graphic object showing the position and shape or the like of the road. The position and shape or the like of such a road is only displayed as a background image. Because road data about that road is not added, a route search relevant to the road cannot be performed. However, by displaying such a road, it is possible to motivate the user of the navigation terminal 20 to purchase the relevant map update right.

It is also conceivable that displaying a new road in a region for which the update right is not granted as above is implemented by using road data, not background data. However, in that case, a problem arises in which road data that can be used for a route search is provided to even a navigation terminal 20 that does not have the relevant update right. Besides, in order to add road data, an update of its related road data may become necessary to maintain consistency in some cases. Hence, the above display is difficult to implement by updating road data such as adding a part of any given road, as long as an existing framework of a map data update function is used.

On the other hand, as for background data, no considerations need to be taken for relations between objects (e.g., consistency or the like), as long as the identifiers of the objects included in the background data are managed not to overlap. Thus, by providing hatching to show a region for which the update right is not granted and information to display a road or the like in the region as background data, it is possible to easily implement displaying information as to whether the terminal has the update right in the framework of the map data update function that existing navigation terminals have.

Figure 6:
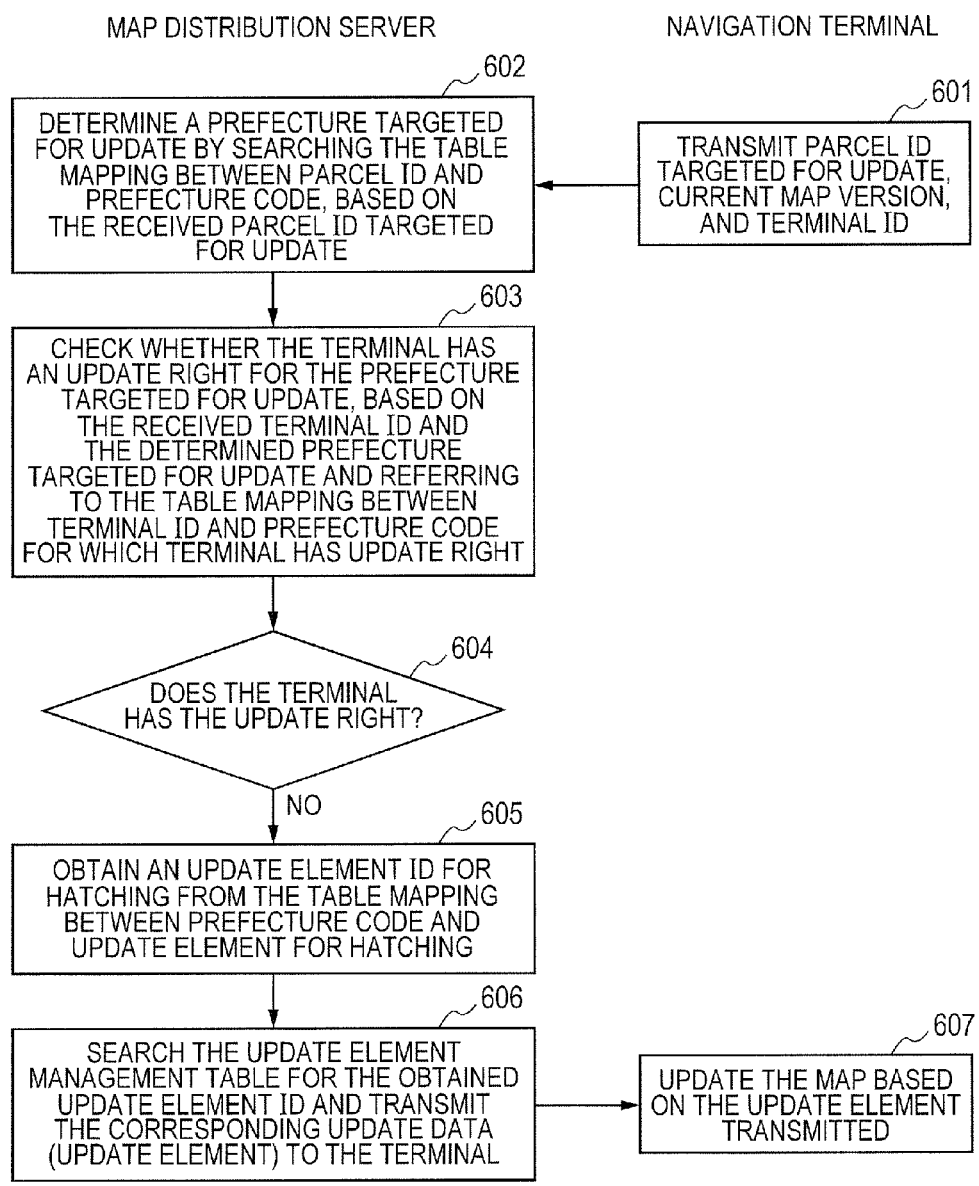
FIG. 6 is a second flowchart of a map data update process that is performed in the map data distribution system of the embodiment of the present invention.

FIG. 5 and FIG. 6 are flowcharts of a map data update process that is performed in the map data distribution system of the embodiment of the present invention. FIG. 5 is a flowchart in a case when the navigation terminal 20 has an update right and FIG. 6 is a flowchart in a case when the navigation terminal 20 does not have an update right.

First, the distribution request module 22 in the navigation terminal 20 transmits a map distribution request including information identifying a parcel whose map data is to be updated (parcel ID targeted for update), the current map version stored on the navigation terminal 20, and information identifying the navigation terminal 20 (terminal ID) to the map distribution server 10 (step 501).

The map update data management module 14 in the distribution server 10 identifies a prefecture targeted for update by searching the table mapping between parcel ID and prefecture code 200 for a match on the parcel ID targeted for update, as the key, included in the received map distribution request (step 502).

Then, the update data management module 14 searches the table mapping between terminal ID and prefecture code for which terminal has update right 300 for a match on the terminal ID, as the key, included in the received map distribution request. By comparing the search result and the prefecture targeted for update identified at step 502, the update data management module 14 checks whether the terminal has an update right of map data for the prefecture targeted for update (step 503).

As the result of the check at step 503, if it has been decided that the navigation terminal that transmitted the map distribution request has the update right of map data for the prefecture targeted for update (step 504), the update data management module 14 searches the table mapping between parcel ID and update element 240 for a match on the parcel ID targeted for update as the key and obtains an update element ID associated with the parcel ID targeted for update (step 505).

Then, the update data management module 14 searches the update element management table 400 for a match on the update element ID obtained at step 505 as the key and transmits the thus obtained update element to the navigation terminal 20 (step 506).

The map update module 23 in the navigation terminal 20 updates the map data according to the received update element (step 507). Specifically, the map update module 23 performs adding, deleting, or altering an object in the parcel targeted for update according to an instruction included in the received update element.

Since steps 601 to 603 in FIG. 6 are the same as steps 501 to 503 in FIG. 5, respectively, their descriptions are dispensed with. Unless otherwise specified, the descriptions on the steps 501 to 503 apply as-is to the steps 601 to 603.

As the result of check at step 603, if it has been decided that the navigation terminal that transmitted the map distribution request does not have the update right of map data for the prefecture targeted for update (step 604), the update data management module 14 searches the table mapping between prefecture code and update element for hatching 320 for a match on the prefecture code of the prefecture targeted for update as the key and obtains an update element ID associated with the prefecture targeted for update (step 605).

Then, the update data management module 14 searches the update element management table 400 for a match on the update element ID obtained at step 605 as the key and transmits the thus obtained update element (that is, update element for hatching) to the navigation terminal 20 (step 606).

Hatching to show that the update right is not granted may be displayed only over the parcel targeted for update. However, if an update right is managed on a per-prefecture basis, hatching displayed over the entire region of a prefecture for which the terminal does not have an update right is regarded as more helpful to make the user aware that the update right is not granted. Hence, if the parcel targeted for update is included in the prefecture for which the terminal does not have the update right, the update data management module 14 obtains update elements for hatching related to all parcels within the prefecture and transmits them to the navigation terminal 20.

The map update module 23 in the navigation terminal 20 updates the map data according to the received update elements (step 607). This procedure is the same as step 507 in FIG. 5.

The map data update process then terminates.

If a plurality of prefectures are identified as those targeted for update at step 502 and if a subset of them is judged as a prefecture for which the terminal has the update right (step 504), but the remaining subset is judged as a prefecture for which the terminal does not have the update right (step 604), the steps 505 to 507 are executed for the parcel including a prefecture for which the terminal has the update right and the steps 605 to 607 are executed for a prefecture for which the terminal does not have the update right.

By the way, generally, the boundary of a parcel does not match the boundary of a prefecture. Consequently, it may happen that a plurality of prefectures fall within one parcel and a subset of them is judged as a prefecture for which the terminal has the update right and the remaining subset is judged as a prefecture for which the terminal does not have the update right (step 503). For example, if a navigation terminal 20 that has an update right for prefecture A, but does not have an update right for prefecture B transmits a map distribution request for a parcel targeted for update that includes the boundary between both prefectures (step 501), the update data management module 14 may decide that the terminal has the update right for the entire parcel targeted for update (step 503) and may execute the steps 505 and 506. In this case, update elements for hatching related to the parcel targeted for update are not transmitted.

Alternatively, in the above case, for the parcel targeted for update, the update data management module 14 may execute both the procedure to follow if it has been decided that the terminal has the update right (steps 505 and 506) and the procedure to follow if it has been decided that the terminal does not have the update right (steps 605 and 606). In this case, road data and background data or the like in the entire parcel are updated, according to an update element associated with the parcel targeted for update. Further, hatching or the like is displayed over prefecture B for which the terminal does not have the update right, according to an update element for hatching associated with the parcel. If the hatching is translucent, the underlying background being displayed is visible.

It is undesirable that hatching continues to be displayed for a long time, even if it is translucent, since it may hinder the visibility of the underlying background being displayed.

Hence, the navigation terminal 20 may terminate the display of hatching at suitable timing. Specifically, information representing a time limit of display may be included in an update element for hatching that is distributed by the map distribution server 10. After the navigation terminal 20 starts to display hatching, according to updated map data at step 607, it may stop the hatching display upon the elapse of the time limit of display and display the underlying map (not updated) again.

At the above step 501, a map distribution request may be transmitted at any timing. For example, it may be transmitted periodically or in response to a user's command. Alternatively, for each parcel, the navigation terminal 20 may count the frequency at which the user actually has passed across the parcel (e.g., the number of times the user has passed across the parcel for a predefined period) and may transmit an update request for the parcel when the passage frequency for the parcel has exceeded a predetermined value.

Alternatively, the navigation terminal 20 may transmit a map distribution request that includes information representing the passage frequency per parcel as described above. The update data management module 14 in the map distribution server 10 having received this map distribution request, if it has been decided that the terminal does not have the update right for the parcel targeted for update (step 604), may further decide whether the passage frequency included in the map distribution request exceeds a predetermined value. Only if it has been decided that the passage frequency exceeds the predetermined value, the update data management module 14 may execute the steps 605 and 606. If the passage frequency included in the map distribution request does not exceed the predetermined value, no update element is eventually selected and the map data for the parcel targeted for update is not updated. Updating map data of a prefecture that the user passes across more often is regarded as more beneficial for the user. By displaying hatching over only a region for which the passage frequency is high, it is possible to preferentially induce the user to purchase an update right that is more beneficial.

While, in the foregoing embodiment, a display (e.g., hatching) or the like to show a prefecture for which the terminal does not have an update right has been discussed as an example of additional information, the present invention can also be applied to other additional information. Another example of additional information is a display of weather information. For example, the map distribution server 10, in addition to primary update elements (that is, update elements that are registered in the table mapping between parcel ID and update element 240), may create a second update element including display data for showing a road having a possibility of being flooded in case of a so-called guerilla-like torrential rain occurring as background data. If weather condition fulfills a certain condition (for example, the precipitation in an area surrounding or upstream of the parcel targeted for update exceeds a predetermined value), then the map distribution server 10 may transmit the second update element to the navigation terminal 20.

According to the embodiment of the present invention described hereinbefore, by handling additional information like display data, for example, for showing a region for which the update right is not granted, as background data, it is possible to provide additional information at low cost and in an easy-to-use form by using the framework of the map data update function that existing navigation terminals have.

What is claimed is:

1. A map data distribution server that is connected to a network and distributes map data via the network, the map data distribution server comprising an interface connected to the network, a processor connected to the interface, and a storage device connected to the processor, wherein the storage device holds first map data and second map data that is of a newer version than the first map data, wherein the storage device holds, for each of one or more partitions of a given size on a map, a plurality of update data including first update data including an instruction to update the first map data in the each partition to the second map data, and second update data including an instruction to add a graphic object showing a region for which an update right is not granted to update the first map data to the second map data, wherein the storage device holds update right information mapping between one or more terminals and a region for which each terminal has an update right to update the first map data stored on the terminal to the second map data, wherein the processor decides, upon receiving an update request to update the first map data in a first partition of the one or more partitions to the second map data from one of the terminals, whether the first partition includes a region for which the terminal that transmitted the update request has the update right to update the first map data to the second map data, based on information identifying the terminal that transmitted the update request included in the received update request and the update right information, and wherein the processor selects the first update data if it has been decided that the first partition includes a region for which the terminal that transmitted the update request has the update right to update the first map data to the second map data, selects the second update data if it has been decided that the first partition does not include a region for which the terminal that transmitted the update request has the update right to update the first map data to the second map data, and transmits the selected update data to the terminal.

2. The map data distribution server according to claim 1, wherein the first update data comprises road update data including information instructing to update a road network and background update data including information instructing to add, delete, or alter a graphic object showing a planimetric feature other than roads on the map, and wherein the second update data does not include the road update data, but comprises, as the background update data, an instruction to add a graphic object showing a region for which an update right is not granted to update the first map data to the second map data.

3. The map data distribution server according to claim 2, wherein the second update data further comprises an instruction to add a graphic object showing the position and shape of a road newly added in the second map data and falling within the region for which an update right is not granted to update the first map data to the second map data.

4. A map data distribution system comprising a map data distribution server that is connected to a network and distributes map data via the network and one or more terminals that communicates with the map data distribution server via the network, the map data distribution server including a first interface connected to the network, a first processor connected to the first interface, and a first storage device connected to the first processor, wherein the first storage device holds first map data and second map data that is of a newer version than the first map data, wherein the first storage device holds, for each of one or more partitions of a given size on a map, a plurality of update data including first update data including an instruction to update the first map data in each partition to the second map data, and second update data including an instruction to add a graphic object showing a region for which an update right is not granted to update the first map data to the second map data, wherein the first storage device holds update right information mapping between each of the one or more terminals and a region for which each terminal has an update right to update the first map data stored on each terminal to the second map data, each terminal including a second interface for communication with the map data distribution server via the network, a second processor connected to the second interface, and a second storage device connected to the second processor, wherein the second storage device provided in the terminal holds the first map data, wherein the second processor provided in the terminal transmits to the map data distribution server an update request to update the first map data in a first partition of the one or more partitions to the second map data, wherein the first processor provided in the map data distribution server decides, upon receiving the update request from the terminal, whether the first partition includes a region for which the terminal that transmitted the update request has the update right to update the first map data to the second map data, based on information identifying the terminal that transmitted the update request included in the received update request and the update right information, wherein the first processor selects the first update data if it has been decided that the first partition includes a region for which the terminal that transmitted the update request has the update right to update the first map data to the second map data, selects the second update data if it has been decided that the first partition does not include a region for which the terminal that transmitted the update request has the update right to update the first map data to the second map data, and transmits the selected update data to the terminal, and wherein the terminal updates the first map data according to the received update data.

5. The map data distribution system according to claim 4, wherein the first update data includes road update data having information having to update a road network and background update data including information instructing to add, delete, or alter a graphic object showing a planimetric feature other than roads on the map, and wherein the second update data does not include the road update data, but comprises, as the background update data, an instruction to add a graphic object showing a region for which an update right is not granted to update the first map data to the second map data.

6. The map data distribution system according to claim 5, wherein the second update data further comprises an instruction to add a graphic object showing the position and shape of a road newly added in the second map data and falling within the region for which an update right is not granted to update the first map data to the second map data.

7. The map data distribution system according to claim 4, wherein each terminal further includes a screen output interface that outputs graphic objects including a map, wherein the second update data includes information representing a time limit of display, and wherein each terminal, when having received the second update data, outputs graphic object data that displays a map updated according to the second update data from the screen output interface and, upon elapse of the time limit of display, outputs graphic object data that displays a map before being updated according to the second update data from the screen output interface.

8. The map data distribution system according to claim 4, wherein each terminal holds information representing a passage frequency of the terminal across each partition, wherein the update request includes the information representing the passage frequency, wherein the map data distribution server decides whether the passage frequency determined by the information included in the update request is larger than a predetermined value, if it has been decided that the first partition does not include a region for which the terminal that transmitted the update request has the update right to update the first map data to the second map data, wherein the map data distribution server selects the second update data, if it has been decided that the passage frequency is larger than the predetermined value, and wherein the map data distribution server selects neither the first update data nor the second update data, if it has been decided that the passage frequency is not larger than the predetermined value.

9. A map data distribution method by a map data distribution server that is connected to a network and distributes map data via the network, wherein the map data distribution server comprises an interface connected to the network, a processor connected to the interface, and a storage device connected to the processor, holds first map data and second map data that is of a newer version than the first map data, and holds a plurality of update data including first update data including an instruction to update the first map data in each of one or more partitions to the second map data, and second update data including an instruction to add a graphic object showing a region for which an update right is not granted to update the first map data to the second map data, wherein the map data distribution server holds update right information mapping between one or more terminals and a region for which each terminal has an update right to update the first map data stored on the terminal to the second map data, and wherein the map distribution method comprises the following steps that are performed by the map data distribution server:

a first step of deciding whether a first partition of the one or more partitions includes a region for which the terminal that transmitted the update request has the update right to update the first map data to the second map data upon receiving an update request to update the first map data in the first partition to the second map data from one of the one or more terminals, based on information identifying the terminal that transmitted the update request included in the received update request and the update right information;

a second step of selecting the first update data if it has been decided that the first partition includes a region for which the terminal that transmitted the update request has the update right to update the first map data to the second map data, and selecting the second update data if it has been decided that the first partition does not include a region for which the terminal that transmitted the update request has the update right to update the first map data to the second map data; and a third step of transmitting the selected update data to the terminal.

10. The map data distribution method according to claim 9, wherein the first update data includes road update data including information instructing to update a road network and background update data having information instructing to add, delete, or alter a graphic object showing a planimetric feature other than roads on the map, and wherein the second update data does not include the road update data, but comprises, as the background update data, an instruction to add a graphic object showing a region for which an update right is not granted to update the first map data to the second map data.

11. The map data distribution method according to claim 10, wherein the second update data further includes an instruction to add a graphic object showing the position and shape of a road newly added in the second map data and falling within the region for which an update right is not granted to update the first map data to the second map data.

* * * * *